United States Patent [19]

Thomas et al.

[11] 4,261,688
[45] Apr. 14, 1981

[54] HYDRAULIC PRESSURE CONVERTERS

[75] Inventors: Alfred W. Thomas, Koblenz, Fed. Rep. of Germany; Anthony W. Harrison, Birmingham, England

[73] Assignee: Girling Limited, Birmingham, England

[21] Appl. No.: 21,945

[22] Filed: Mar. 19, 1979

[30] Foreign Application Priority Data

Mar. 18, 1978 [GB] United Kingdom ............... 10836/78

[51] Int. Cl.³ ............................................ F04B 17/00
[52] U.S. Cl. ..................................... 417/225; 417/402
[58] Field of Search ........................ 417/225, 402, 391; 91/48, 49, 50

[56] References Cited

U.S. PATENT DOCUMENTS 2,789,510  4/1957  Meying .................................. 417/402

Primary Examiner—Richard E. Gluck
Attorney, Agent, or Firm—Scrivener, Clarke, Scrivener and Johnson

[57] ABSTRACT

An hydraulic pressure converter comprises a differential piston which works in a stepped bore in a housing. A pressure space is defined in the housing at the end of a portion of the piston which is of smaller area so that reciprocation of the piston in the bore causes hydraulic fluid to be drawn into the pressure space through a first one-way valve and then pumped to an outlet through a second one-way valve. Reciprocation of the piston is accomplished by subjecting the piston to pressure from a pump to move the piston in a first direction away from a stop face and against the force in a compression spring so that hydraulic fluid is drawn into the pressure space. A valve assembly is operative to reduce the force urging the piston in the first direction when the displacement attains a predetermined value whereafter the spring is operative to urge the piston in a second opposite direction to force fluid to the outlet from the pressure space.

9 Claims, 1 Drawing Figure

U.S. Patent    Apr. 14, 1981    4,261,688
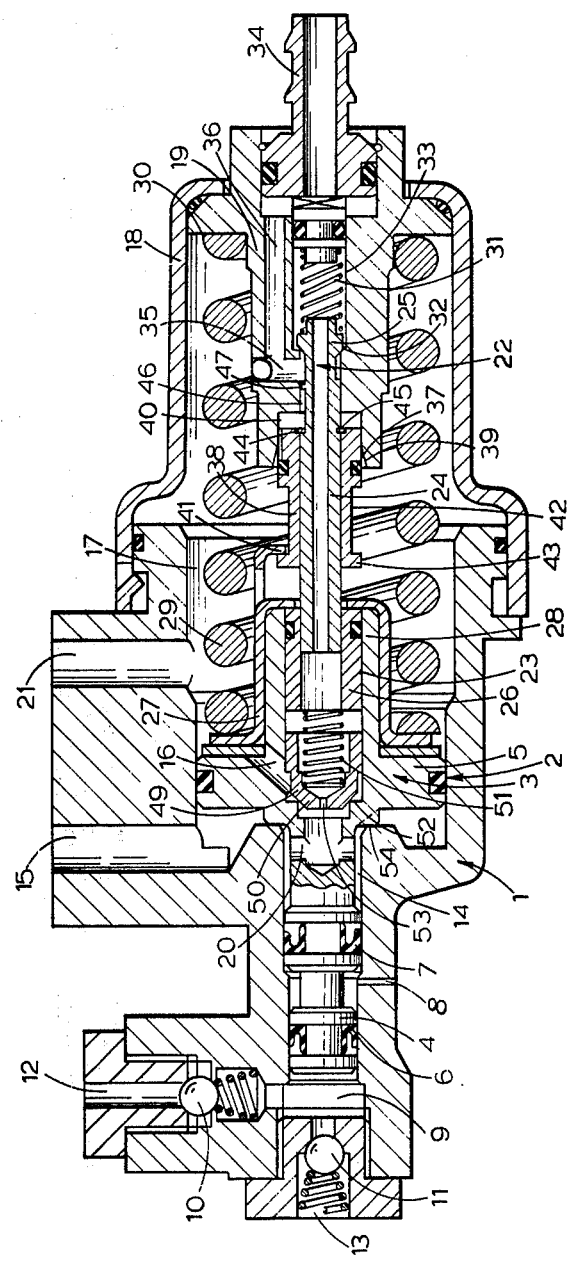

4,261,688

HYDRAULIC PRESSURE CONVERTERS

SPECIFIC DESCRIPTION

This invention relates to hydraulic pressure converters of the kind for generating an intensified or increased hydraulic pressure in a pressure space in response to a lower hydraulic pressure supply.

In vehicles it is generally considered too expensive to provide a high pressure pump for use in a braking system alone. Thus it is desirable to be able to utilise a pump already available in a vehicle for powering steering and/or other ancilliary equipment, for example a self-levelling suspension mechanism. This, in itself, creates difficulties since a pump already installed in a vehicle may not be entirely suitable for powering a braking system. For example its working pressure may be too low, and it may run at a high speed with a comparatively high throughput. This latter difficulty means that the fluid which it pumps must have good lubricating properties and may therefore comprise mineral oil which is not suitable for use in a braking system itself where the brake fluid comprises a vegetable oil.

According to our invention in an hydraulic pressure converter comprising a differential piston working in a stepped bore in the housing and a pressure space defined in the housing at the end of the piston which is of smaller area, the piston is adapted to be reciprocated in the bore to draw hydraulic fluid from an inlet into the pressure space through a first one-way valve upon movement of the piston in a first direction and to pump hydraulic fluid from the pressure space to an outlet through a second one-way valve upon movement of the piston in a second opposite direction, and means are provided for reciprocating the piston in the bore, the means comprising a supply of hydraulic fluid under pressure for generating a force to urge the piston in the first direction away from a datum position, valve means responsive to the displacement of the piston in the first direction for reducing the magnitude of the force when the displacement attains a predetermined value, and resilient means for urging the piston in the second direction when the force is reduced to a smaller value by the valve means.

Due to the differences in areas the pressure generated in the pressure space is higher than the supply of hydraulic fluid pressure for generating the force in opposition to the resilient means, and the piston and the valve means are so constructed and arranged that the fluid pressure from, or a fluid pressure generated by, the supply of fluid under pressure is at all times supplied to an outlet passage in the housing for powering ancilliary equipment at least when the supply of fluid is operative. Specifically the supply of pressure is supplied at all times to a chamber defined in the bore between the portions of the piston which are of different areas and, when the valve means is closed, hydraulic fluid is supplied to the outlet passage by displacement of the piston in the bore in the first direction away from the datum position. When the valve means opens and the piston is moved in the second direction by the resilient means, conveniently a compression spring, the fluid from the supply is supplied directly to the outlet passage through a by-pass passage in the piston which is exposed when the valve means opens, and remains open until the piston has again reached the datum position by movement in the second direction.

Thus our invention enables a higher pressure to be developed in a sub-system, suitably a braking system, from a single source of lower pressure, conveniently a pump for the steering system or other ancilliary equipment of a vehicle, for example suspension levelling, or for circulating oil through the engine itself for lubricating or cooling purposes. It follows that brake fluid from a reservoir at atmospheric pressure can be pressurised by the pressure converter which is motivated by pressure from a different type of fluid. In such a case the smaller diameter portion of the piston is provided with spaced seals disposed in all positions of the piston in the bore on opposite sides of a bleed to atmosphere to ensure that The fluid will not mix upon failure of one of the seals.

The valve means includes a pressure relief valve for relieving the pressure in the pressure chamber at the predetermined value of displacement, in combination with a by-pass valve which opens the by-pass passage in response to a reduction in pressure on the side of the by-pass valve remote from the pressure chamber which is caused by the relief valve opening.

One embodiment of our invention is illustrated in the single FIGURE of the accompanying drawings which is a longitudinal section through an hydraulic pressure converter.

The hydraulic pressure converter illustrated in the drawings comprise a housing 1 having a stepped longitudinal bore 2 in which works a differential piston 3 having a portion 4 of smaller diameter and a portion 5 of greater diameter. The portion 4 is provided with spaced seals 6 and 7 which are disposed on opposite sides of a vent passage 8 which vents to atmosphere the portion between the seals 6 and 7, irrespective of the position of the piston 3 in the bore 2.

A pressure space 9 is defined in the housing in advance of the piston portion 4. Oppositely acting one-way valves 10 and 11 provide communication between an inlet port 12 for connection to a reservoir for hydraulic brake fluid and the pressure space 9, and an outlet port 13 for connection to a braking system, suitably an hydraulic accumulator, respectively.

A pressure chamber 14 is defined in the bore between the piston portions 4 and 5 and an inlet passage 15 for connection to a pump for fluid, suitably a pump for the steering mechanism of the vehicle, leads into the pressure chamber 14. An inclined by-pass passage 16 in the piston 3 provides communication between the pressure chamber 14 and a supply chamber 17 which is defined by the portion of the bore 2 between the piston portion 5 and a cylindrical shell 18 which projects from the end of the housing 1 which is remote from the port 13 and provides a mounting for a valve block 19. The by-pass passage 16 leads into the chamber 14 through a transverse passage 20 in the piston 3. An outlet passage 21 in the housing 1 leads from the supply chamber 17 for connection to the steering mechanism.

Valve means 22 are located in and between the piston 3 and the valve block 19. As illustrated the inner end of the piston 3 has a longitudinally extending bore 23 which leads into the transverse passage 20. A hollow rod 24 having an enlarged head 25 at its free end is slidably guided in a bushing 26 which is retained in the inner end of the bore 23 by means of a fitting 27 of top-hat outline. The fitting 27 encloses an extension 28 of reduced diameter at the end of the piston 3 and comprises an abutment for one end of a compression spring 29 of which the outer end abuts against a radial shoulder 30 on the valve block 19. The head 25 is normally urged by a spring 31 into engagement with a seating 32 at an intermediate part in the length of a longitudinal bore 33 in the valve block 19 into which the rod 24 extends. This cuts-off communication between a union 34 in the free end of the block 19 for connection to a reservoir for hydraulic steering fluid and the bore 23, through a radial port 35 in the block 19 which leads to the union 34 through an eccentrically disposed axial bore 36. In that position a seal 37 on a hollow floating piston 38 slidably mounted on the rod 24 is held in a position spaced from an inclined shoulder 39 at the free end of a counterbore 40 in the valve block 19 by means of a cranked finger 41 which extends from the fitting 27. The cranked finger 41 is received in a circumferential groove 42 of substantial length and is engageable with a shoulder 43 at the end of the groove 42 which is adjacent to the piston 3 to hold the seal 37 away from the inclined shoulder 39.

A circlip 44 received in a groove 45 in the rod 24 forms an abutment for the end of the floating piston 38 remote from the piston 3 to limit movement of the piston 38 with respect to the rod 24 in a direction towards the head 25. The groove 45 is disposed at the end of a flat 46 on the rod 24, and the flat 46 terminates at a land 47 which is retained wholly within the bore 33 when the seal 37 is spaced from the inclined shoulder 39.

Finally a flow-control valve 49 comprising a valve member 50 of thimble outline which is normally urged by a light spring 51 into engagement with a seating 52 between the passage 20 and the by-pass passage 16, controls communication between the pressure chamber 14 and the supply chamber 17. The valve member 50 has a restricted passage 53 in its closed end to permit restricted flow past the valve 49 when it is in its closed position with the member 50 engaging with the seating 52.

In the inoperative position shown in the drawings in which the pump connected to the passage 15 is inoperative, the piston 3 is held by the spring 29 in a retracted position in abutment with a stop face 54 defined by a shoulder at the step in diameter between the portions of the bore 2 which are of different areas. In this position the seal 37 is held away from the inclined shoulder 39, and the head 25 is held in engagement with the seating 32 by the spring 31.

When the pump starts to operate, pressure from the pump supplied through the inlet passage 15 acts on the piston 3 over an area equal to the difference in area between the two portions 4 and 5, initially to urge the piston 3 slightly away from the stop face 54 against the force in the spring 29. Fluid under pressure also passes through the restricted passage 53 and into the bore 23 and, since in this position the head 25 is in engagement with the seating 32, the pressures acting across the thimble 50 are equalised so that the closing force in the spring 51 is augmented.

As the pump pressure increases, the piston 3 moves further away from the stop face 54 with the finger 41 moving in the groove 42 with respect to the floating piston 38. This movement of the piston 3 is accompanied by fluid being drawn into the pressure space 9 through the one-way valve 10 by the smaller piston portion 4, and fluid being pumped from the supply chamber 17 to the steering mechanism through the outlet passage 21 by displacement of the piston 3 in the bore 2. This continues until the fitting 27 has engaged with the adjacent end of the floating piston 38. Thereafter further movement of the piston 3 transmitted through the floating piston 38 has the triple sequential effect of:

(1) urging the head 25 away from the seating 32 against the loading on the spring 31 by thrust transmitted to the rod 24 through the circlip 44 to exhaust the interior of the rod 24 to reservoir through the union 34;

(2) causing the land 47 to leave the bore 33 so that the flat 46 defines a passage to subject the inner end of the piston 38 to pressure at the union 34 which is less than that in the supply chamber 17; and (3) causing the seal 37 to move progressively into greater sealing engagement with the inclined shoulder 39 to isolate the supply chamber 17 from the union 34.

When the pressure interior of the rod 24 is exhausted to the reservoir as described above, the thimble 50 is unbalanced and therefore moves away from its seating 52 against the force in the spring 51 so that the pressure chamber 14 communicates directly with the supply chamber 17 through the by-pass passage 16. This equalises the pressures acting on the opposite sides of the piston portion 5, and fluid is supplied directly from the pump to the steering system with the piston 3 momentarily stationary.

When the land 47 leaves the bore 33 the piston 38 is unbalanced and the resultant force acting on the piston 38 and generated by the difference in pressure between the supply chamber 17 and the reservoir causes the seal 37 to seal against the inclined shoulder 39 as described above, with the piston 38 moving with respect to and away from the piston 3.

As the pressure differential acting across opposite sides of the piston portion 5 reduces, the piston 3 is moved in the opposite direction towards the abutment face 54 by the release of the stored energy in the spring 29, and the smaller piston portion 4 pumps fluid from the pressure space 9 into the hydraulic accumulator of the braking system, through the one-way valve 11.

When the piston 3 moves in this direction on the return stroke the head 25 is initially held away from the seating 32 by the friction between the seal 37 and the inclined shoulder 39, and by the force due to the pressure difference between the supply chamber 17 and the union 34 which is applied to the exposed end of the floating piston 38, against the force in the spring 31.

When the piston 3 has moved through a predetermined distance sufficient for the finger 41 to re-engage with the shoulder 43, further movement of the piston 3 in the same direction withdraws the seal 37 from the inclined shoulder 39. This permits the head 25 to be urged into engagement with the seating 32 by the spring 31. The engagement of head 25 with the seating 32 isolates the interior of the rod 24 from the reservoir so that the pressure in the bore 23 can increase by flow past the seating 52. This enables the valve 49 to close and occurs at a change-over position which is reached shortly before the piston 3 can engage with the stop face 54. Thereafter the pressure supplied to the pressure chamber 14 from the pump increases again to cause the piston 3 to move away from the stop face 54 and the sequence described above is repeated.

The engagement of the seal 37 with the inclined shoulder 39 ensures that the piston 3 can complete its predetermined return stroke without the head 25 reengaging prematurely with the seating 32.

The movement of the piston 3 with respect to the stop face 54 in both directions continues automatically until the pressure in the hydraulic accumulator, which acts over the area of the piston portion 4 and which is supplied through the one-way valve 11, exceeds the force in the spring 29. At this point the piston 3 is held in a balanced position in which the pump communicates at all times with the steering mechanism through the valve 49, which is open, and the by-pass passage 16.

When the pump stops operating, the spring 29 returns the piston 3 to the fully retracted initial position in engagement with the stop face 54. However, when the pump is operating normally with the steering mechanism in a neutral position, the pressure developed by the pump will be sufficient to hold the piston 3 slightly away from the stop face 54 at the change-over position.

The pressure converter described above enables a higher pressure to be developed in the hydraulic accumulator by utilising a pump capable of generating only a lower output pressure. The vent passage 8 ensures that when a different fluid is used in the braking system from that of the pump, failure of one of the seals 6 and 7 will prevent the two fluids from mixing. This makes the converter particularly suitable for use in a power braking system of the type described in of our co-pending U.S. patent application Ser. No. 7,215 and filed Jan. 29, 1979. It will be understood that one of the seals 6 or 7 and the vent passage 8 may be omitted if the converter is to be used only with one type of fluid.

We claim:

1. An hydraulic pressure converter comprising a housing having a stepped bore, a differential piston adapted to be reciprocated in said stepped bore and having a first piston portion of smaller area and a second piston portion of greater area, and means defining a pressure space in housing in advance of said first piston portion, said housing also having an inlet, an outlet, and an outlet passage for connection to ancilliary equipment, a first one-way valve between said inlet and said pressure space, a second one-way valve between said pressure space and said outlet, and means for reciprocating said piston in said bore to draw hydraulic fluid from said inlet into said pressure space through said first one-way valve upon movement of said piston in a first direction away from a datum position and to pump hydraulic fluid from said pressure space through said second one-way valve and to said outlet upon movement of said piston in a second opposite direction, said means for reciprocating said piston comprising a supply of hydraulic fluid under pressure for generating a force to urge said piston in said first direction away from said datum position, valve means responsive to displacement of said piston in the first direction for reducing the magnitude of said force when said displacement attains a predetermined value, and resilient means for urging said piston in said second direction when said force is reduced to a smaller value by said valve means, wherein a pressure chamber is defined in said bore between said first piston portion and said second piston portion and hydraulic fluid is supplied at all times to said pressure chamber, and where-in said valve means includes a pressure relief valve for relieving said pressure chamber at a predetermined value of displacement of said piston, in combination with a by-pass valve which opens a by-pass passage in said piston between said pressure chamber and said outlet passage in response to a reduction in pressure on the side of said by-pass valve remote from said pressure chamber which is caused by said relief valve opening.

2. An hydraulic pressure converter as claimed in claim 1, wherein said by-pass passage is exposed when said valve means opens and said piston is moved in said second direction by said resilient means, and said valve means remains open until said piston has again reached said datum position by movement in said second direction.

3. An hydraulic pressure converter as claimed in claim 1, wherein said resilient means comprises a compression spring.

4. An hydraulic pressure converter as claimed in claim 1, wherein said first piston portion is provided with spaced seals disposed in all positions of said piston in said bore on opposite sides of a bleed to atmosphere in said housing.

5. An hydraulic pressure converter as claimed in claim 1, wherein said by-pass valve comprises a valve member which is guided to slide in a bore in said differential piston and is engageable with a first seating in said differential piston to isolate said pressure chamber from said by-pass passage, and said pressure relief valve comprises a head engageable with a second seating to isolate said pressure chamber from a connection to a reservoir for hydraulic fluid, and a hollow stem carrying said head and guided to slide in a bore in said differential piston which leads into said bore in which said valve member is guided to slide and which is located in the end of said second piston portion, and the valve member is provided with a restricted passage through which the interior of said stem communicates with said pressure chamber, movement of said head away from said second seating when said pressure in said pressure chamber exceeds the force of said resilient means reducing the pressure in the interior of said stem to unbalance said valve member which moves away from said first seating to place said pressure chamber in communication with said by-pass passage.

6. An hydraulic pressure converter as claimed in claim 5, wherein a valve piston is guided to slide on said hollow stem and is adapted to seal against an annular face between a supply chamber with which said by-pass passage is in open communication and said second seating, said valve piston being held in a position spaced from said face when said head is in engagement with said second seating but being urged into sealing engagement with said face when movement of said differential piston against said resilient means exceeds a predetermined value.

7. An hydraulic pressure converter as claimed in claim 6, wherein said valve piston acts on said stem through an abutment.

8. An hydraulic pressure converter as claimed in claim 6, wherein said stem has a land which is sealingly received in a bore concentric with said annular face to isolate said supply chamber from said connection to said reservoir when said head is in engagement with said second seating and said valve piston is spaced from said annular face, sealing engagement of said valve piston with said face being followed by said land leaving said bore to subject the end of said valve piston remote from said supply chamber to a pressure less than that to which the opposite end of said valve piston is subjected whereby to enhance the sealing engagement of said valve piston with said annular face.

9. An hydraulic pressure converter as claimed in claim 6, wherein said valve piston carries a radial seal, and said annular face comprises an inclined shoulder with which said seal moves progressively into greater sealing engagement as said valve piston is moved by said differential piston against said resilient means.

* * * * *